(12) United States Patent
Fan

(10) Patent No.: US 7,586,646 B2
(45) Date of Patent: Sep. 8, 2009

(54) SYSTEM FOR PROCESSING AND CLASSIFYING IMAGE DATA USING HALFTONE NOISE ENERGY DISTRIBUTION

(75) Inventor: Zhigang Fan, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 632 days.

(21) Appl. No.: 11/402,531

(22) Filed: Apr. 12, 2006

(65) Prior Publication Data

US 2007/0242288 A1 Oct. 18, 2007

(51) Int. Cl.
*H04N 1/40* (2006.01)
*G06T 7/00* (2006.01)
*G06K 9/40* (2006.01)
*G06K 9/80* (2006.01)

(52) U.S. Cl. .................. 358/2.1; 382/173; 382/224; 382/205; 382/264

(58) Field of Classification Search .................. 358/1.9, 358/2.1, 3.06, 3.21, 3.24, 462; 382/173, 382/176, 195, 205, 224, 260, 264
See application file for complete search history.

(56) References Cited

U.S. PATENT DOCUMENTS 5,850,474 A * 12/1998 Fan et al. .................. 382/173
6,185,328 B1   2/2001 Shiau
2005/0271277 A1 * 12/2005 Lin et al. .................. 382/173

FOREIGN PATENT DOCUMENTS

JP           63205783 A  *  8/1988

* cited by examiner

*Primary Examiner*—Scott A Rogers
(74) *Attorney, Agent, or Firm*—Fay Sharpe LLP

(57) ABSTRACT

A method and system is provided for processing scanned data representative of a document image for classifying portions of the data into contone, low frequency halftone or high frequency halftone regions. The method comprises identifying an image data value of an original pixel within a portion of a document image. Average pixel values are calculated for the plurality of image regions. First and second halftone noise energy values are computed relative to the original pixel value for the plurality of image regions. The noise values are compared against preselected standards and based upon the comparing, the region can be classified as high frequency halftone, low frequency halftone or contone. Portions of image of data which may introduce unwanted biases in the measurements such as edge portions, all black or all white portions are excluded from the energy level calculations.

16 Claims, 2 Drawing Sheets

SYSTEM FOR PROCESSING AND CLASSIFYING IMAGE DATA USING HALFTONE NOISE ENERGY DISTRIBUTION

The presently disclosed embodiments are directed to pixel image processing for identifying scanned data representative of document image as contone, low frequency halftone, or high frequency halftone.

BACKGROUND

In the storage and reproduction of images from an original document, or other kinds of image data (e.g. visual), and more particularly to the storage and rendering of image data representing an original document that has been electronically scanned, storage efficiencies and high reconstructive image quality can be better realized if the image data is segmented in a manner to better facilitate the storage and rendering. One such segmenting method comprises identifying an image or image region as continuous tone (contone) or halftone (clustered halftone). In addition, estimating the frequency ranges of the halftones (low or high) is also advantageous for better storage and reproduction efficiencies. Accurate segmentation by such identification facilitates mixed raster content ("MRC") modeling useful for achieving high compression ratios while maintaining high reconstructed image quality. Reliable halftone detection is also important for avoiding moiré artifacts.

By "contone" is meant continuous tone images that use different concentration colorants such as cyan, magenta and yellow to produce different colors. The term "continuous" comes from the fact that, at each spatial location, such printing varies the color and concentrations or amounts over a continuous range. Contone printers require reliable and accurate spatial control of colorant concentrations, which is difficult to achieve and control accurately. As a result, contone printers are rather expensive. Most desktop printers are therefore based on the simpler technique of halftoning. Halftoning exploits the spatial low pass characteristics of the human eye. Color halftone images are produced by placing a large number of small, differently colored dots on paper. Due to the low pass nature of the eye's spatial response, the effective spectrum seen by the eye is the average of the spectra over a small angular subtense. Different colors are produced by varying the relative areas of the differently colored dots. In contrast with contone printing, the concentration of a colorant within a dot is not varied, so halftone printers are considerably easier and less expense to manufacture.

Halftone imaging detection is an important procedure for many applications. Halftone imaging can be identified for an entire page, or in some instances for an image region thereon. Halftone detection usually not only classifies an image into contone or halftone, but also estimates the frequency ranges of the halftones. Typically the frequency ranges are lumped into two, high frequency and low frequency. In object oriented rendering, the image regions with different kinds of halftone textures are treated differently in enhancement, color conversion, and halftoning to achieve optimized image quality. Similarly, in MRC segmentation, different kinds of regions may be coded in different manners for different halftone features, for optimizing data storage and processing efficiencies.

Accurate halftone detection is not easy. Quite often, complicated operations are required. (c.f. U.S. Pat. No. 6,185,328, the disclosure of which is incorporated herein by reference in its entirety.)

Accordingly, there is a need for a halftone detection method which minimizes complicated operational steps and can be implemented with relatively simple calculations, while maintaining accurate characteristic classification.

Halftone noises are high-pass in nature. By "halftone noise" is meant the noise introduced during the halftoning process. By "high-pass" is meant that the high frequency is dominant in data. The halftone noise frequency is generally higher in frequency than the image content frequency. However, this is not always true, particularly in the regions of an image where sharp edges exist. As a strong edge contains a spectrum rich in high frequencies, the halftone image and image content may not be separable in frequency domain in the vicinity of the edges. Halftones of different frequencies have different halftoning noise energy distributions. The high frequency halftone noise has a higher cutoff frequency than the low frequency one.

Accordingly, there is a need for a method and system which can classify images, or image regions, into contone, high frequency halftone or low frequency halftone using noise energy distribution to facilitate better image segmentation, more efficient data storage, and all while maintaining high reconstructed image quality.

SUMMARY

According to aspects illustrated herein, there is provided a method and system for processing scanned data representative of a document image for detecting halftone characteristics of the image. An image value of a selected pixel within an image region of the image is identified. The image is filtered with a plurality of averaging windows about the selected pixel for generating a filtered set of pixel values associated with the selected pixel image value. A noise energy value is calculated for the filtered set of pixel values in a selected pixel image value. The image region is then classified as either contone, low frequency halftone, or high frequency halftone based on the calculated noise energy value.

According to other aspects illustrated herein, a method and system for processing scanned data representative of a document image for classifying the data into contone, low frequency halftone, or high frequency halftone blocks, is provided. An image value of an original pixel within a portion of the document image is identified. Average pixel values are calculated for selected neighborhoods of the original pixel. Halftone noise values are computed relative to the original pixel value image value and the selected neighborhoods. The computed noise values are compared against a preselected standard and based on the comparing, the image can be classified as either high frequency halftone, low frequency halftone, or contone.

According to another aspect illustrated herein, a xerographic system is provided including an assembly for processing scanned data representative of a document image can detect distinct image regions as contone, low frequency halftone, or high frequency halftone. A processor segments the image into selected regions of pixels, computes halftone noise energy values for the selected regions, and classifies the regions as contone, low frequency halftone, or high frequency halftone based upon a comparison of the computed energy values against a preselected standard.

In accordance with a more limited aspect, the processor excludes edge pixels, black portions or white portions from the selected blocks used for the computing of the halftone noise energy values.

DETAILED DESCRIPTION

The subject embodiments relate to processing scanned image data for classifying the data based upon the halftone characteristics thereof, and then ultimately segmenting the data in a manner to achieve improved compression ratios and good reconstruction image quality. The process and system thus classifies images, (or image regions) into contone, high frequency halftone or low frequency halftone using noise energy distribution detected for the images.

Figure 1:
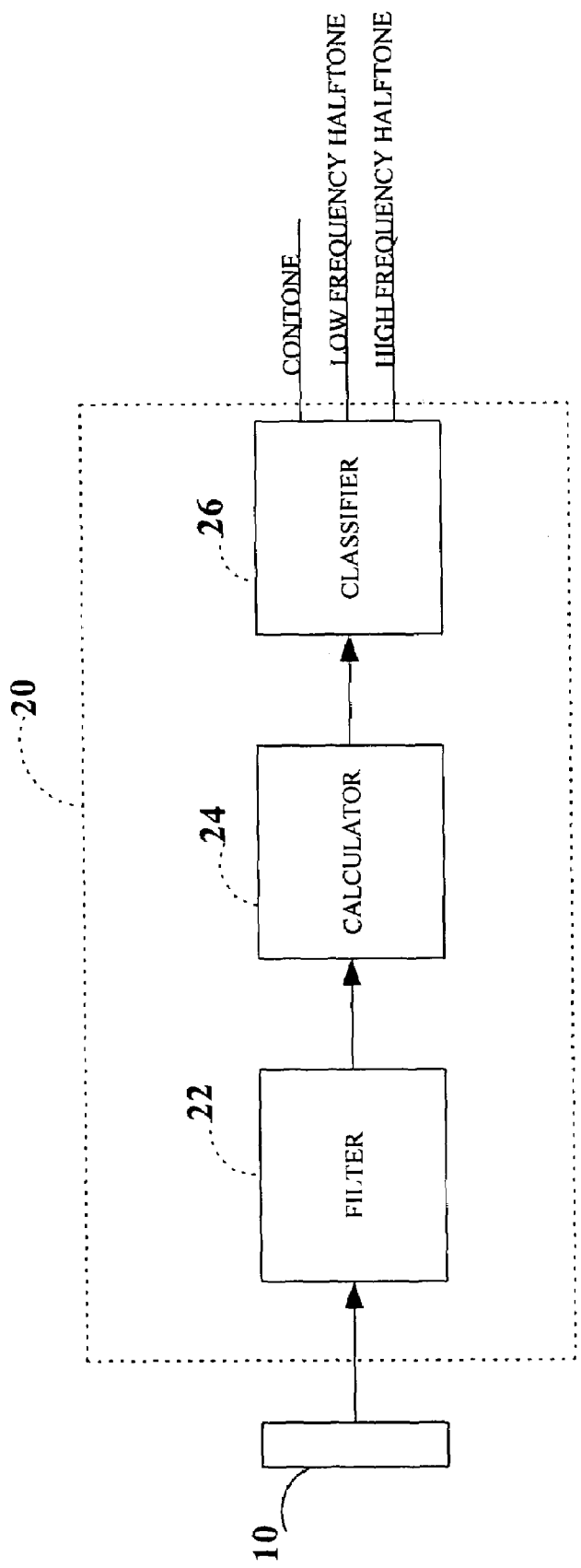
FIG. 1 is a block diagram detailing the processor assembly of one embodiment.

With reference to FIG. 1, the subject system comprises an assembly 20 comprised of a filter 22 which filters the image data 10 for generating a filter set of pixel values associated with the selected pixel value. Calculator 24 calculates a noise energy value with the filter set of pixel values in the selected image pixel. The calculated noise energy value is then used as a basis by classifier 26 to classify the image data as either contone, low frequency halftone or high frequency halftone.

Figure 2:
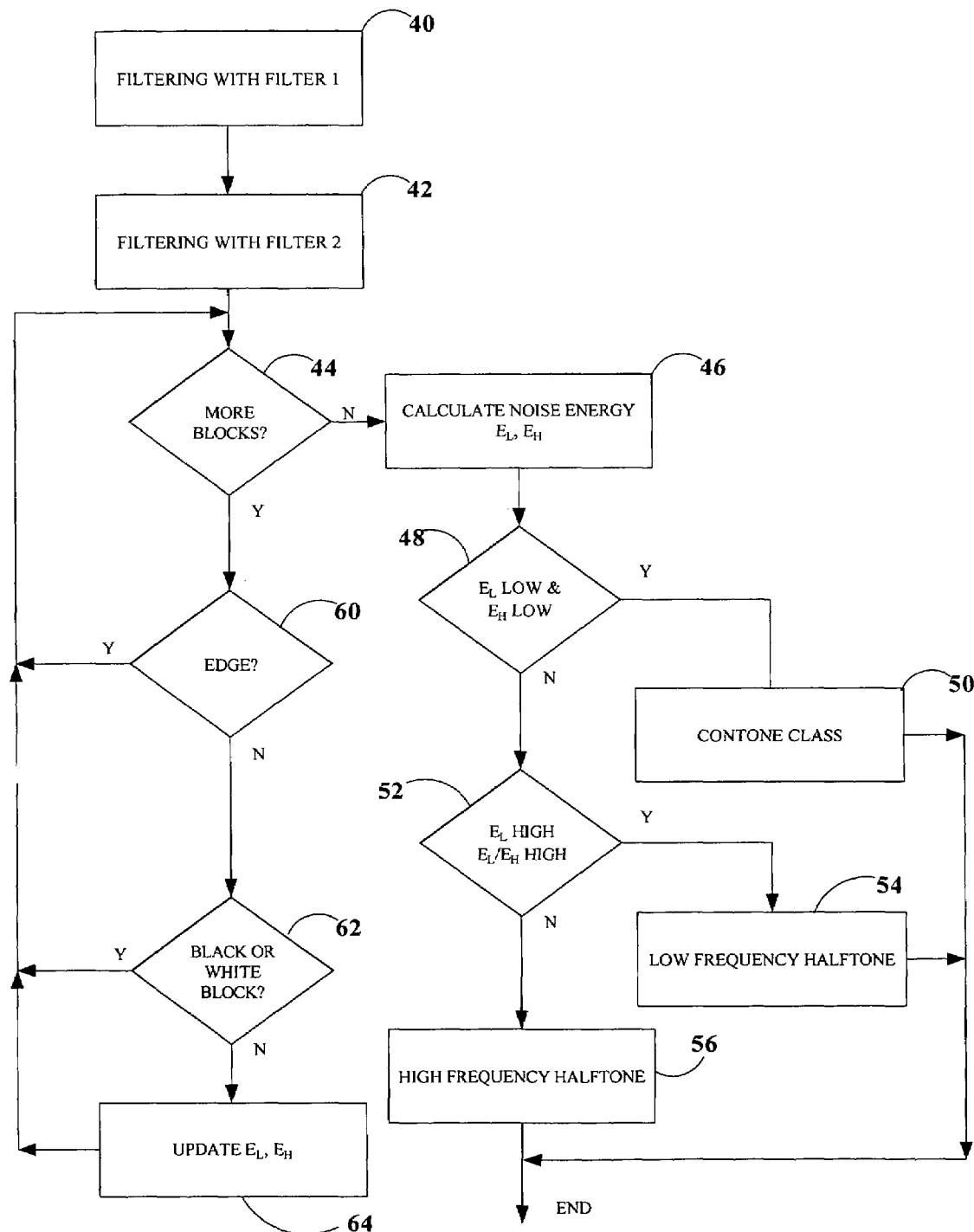
FIG. 2 is a flowchart illustrating processing of image data for halftone detection using noise energy distribution as a basis for classifying halftone aspects.

More particularly, and with reference to FIG. 2, the image data is first low-passed filtered at two frequencies. The first filtering 40 removes halftone noises of all frequencies and the other filtering 42 removes halftone noises from high frequency halftones. A simple averaging is usually sufficient for this filtering purpose. As an example, for a 300 dpi image, averaging windows could be 2×2 and 4×4, respectively. For a color image, the filtering and the rest of the processing operation only perform in the luminance channel. The image is intended to be segmented into a plurality of image blocks 44, some of which are excluded from the processing, as will be explained further below.

Two energy levels are then measured by calculating 46 a noise energy value for the image data. Energy level calculation starts with selecting an original pixel in the image. In one embodiment, the averaging windows for the energy level calculation are between the 2×2 result and the 4×4 result and between the originally selected pixel within the image data and the 2×2 result. Such calculations characterize low frequency $E_L$ and high frequency $E_H$ halftone noises respectively. The following equations comprise such a calculation:

$$E_L = \Sigma [y_2(m,n,)-y_4(m,n)]^2 \quad (1)$$

$$E_H = \Sigma [y_0(m,n,)-y_2(m,n)]^2 \quad (2)$$

where $y_0(m,n)$, $y_2(m,n)$ and $y_4(m,n)$ are the image values at pixel (m,n) for the original, 2×2 result and the 4×4 result, respectively.

The equations (1) and (2) are calculated block by block, with a typical block size of 8×8 to 16×16.

There are certain regions in the image which are excluded from the energy level calculations. Strong edges within the image region may contaminate the noise level measurement results, so blocks of image data containing edges are excluded 60. For each block, the dynamic range is checked in the 4×4 filtering result. If the difference between the maximum value and a minimum pixel value is greater than a threshold, which indicates possible existences of edges, the block is not included in the energy level calculations. In addition, image regions comprising a very bright or very dark block (i.e., a block with a very high minimum or very low maximum, respectively) are excluded 62. Halftones barely exist in highlights and shadows and may also introduce unwanted biases in the energy level calculations. In effect, the image data is divided up into blocks and all the blocks comprising either edge lines or white or black are excluded and all other blocks are measured 64 for noise level energy.

Halftone aspect detection decision is made according to the calculated results. If both $E_L$ and $E_H$ are low 48, the image (or image region) is classified as contone 50. If both $E_L$ and $E_L/E_H$ are high 52, the image (or image region) is detected as low frequency halftone 54. Otherwise, the image (or image region) is declared as high frequency halftone 56. A predetermined standard for this determination can be decided by training. During the training, $E_L$ and $E_H$ and $E_L/E_H$ are measured for images with known classifications (contone, low frequency halftone, or high frequency halftone.) Thresholds can be determined to separate the images of different classes.

The claims can encompass embodiments in hardware, software, or a combination thereof.

The word "printer" as used herein encompasses any apparatus, such as a digital copier, bookmaking machine, facsimile machine, multi-function machine, etc. which performs a print outputting function for any purpose.

The claims can encompass embodiments that print in monochrome, color or handle color image data.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for processing scanned data representative of a document image for detecting halftone characteristics of the image, comprising:

identifying in an image processor an image value of a selected pixel within an image region;

filtering by a filterer the image with a plurality of averaging windows about the selected pixel for generating a filtered set of pixel values associated with the selected pixel image value;

calculating in a calculator a noise energy value with the filtered set of pixel values and the selected pixel image value; and, transforming with a classifier the image region as either a classified contone, low frequency halftone or high frequency halftone from the calculated noise energy value.

2. The method of claim 1 wherein the filtering comprises low-pass filtering at a first and second frequency comprising first and second ones of the plurality of averaging windows.

3. The method of claim 2 wherein the first one averaging window is 2×2, and the second one averaging window is 4×4.

4. The method of claim 1 wherein the calculating the noise energy value comprises calculating in accordance with $$E_L = \Sigma [y_2(m,n,)-y_4(m,n)]^2$$

$$E_H = \Sigma [y_0(m,n,)-y_2(m,n)]^2$$

where $E_L$ represents a first noise energy value determined as between first and second ones of the plurality of averaging windows, $E_H$ represents a second noise energy value determined as between the selected image value and the first one averaging window, and $y_0(m,n)$, $y_2(m,n)$ and $y_4(m,n)$ are image values at the selected pixel (m,n), the first one averaging window, and the second one averaging window, respectively.

5. The method of claim 4 wherein the classifying comprises when both $E_L$ and an $E_L/E_H$ ratio are high, classifying the image region as low frequency halftone, when both $E_L$ and $E_H$ are low, classifying the image region as contone, and for other noise energy values, classifying the image region as high frequency halftone.

6. The method of claim 5 wherein the classifying of the calculated noise energy values as low and high comprises a comparison with a preselected standard.

7. The method of claim 1 further including excluding edge pixels as the selected pixel.

8. The method of claim 1 further including excluding image regions comprising black or white image regions.

9. A method for transforming an unclassified image into a classified image, comprising:
 identifying in an image processor an image value of an original pixel within a region of the document image;
  calculating an average pixel values for selected neighborhoods of this original pixel;
 computing halftone noise values relative to the original pixel image value and the average pixel values;
 comparing the computed noise values against a preselected standard; and,
 based on the comparing;
  transforming the image region as a classified high frequency halftone, low frequency halftone or contone.

10. The method of claim 9 including filtering the scanned data with a frequency filter for removing halftone noises.

11. The method of claim 9 wherein the computing the halftone noise values used the formulas:

$$E_L = \Sigma[y_2(m,n,)-y_4(m,n)]^2$$

$$E_H = \Sigma[y_0(m,n,)-y_2(m,n)]^2$$

where $E_L$ represents a first noise energy value determined as between first and second ones of the selected neighborhoods, $E_H$ represents a second noise energy value determined as between the identified image value and a first neighborhood, and $y_0(m,n)$, $y_2(m,n)$ and $y_4(m,n)$ are image values at the selected pixel (m,n), the first neighborhood, and a second neighborhood, respectively.

12. The method of claim 11 wherein the classifying comprises when both $E_L$ and an $E_L/E_H$ ratio are high, classifying the image region as low frequency halftone, when both $E_L$ and $E_H$ are low, classifying the image region as contone, and for other noise energy values, classifying the image region as high frequency halftone.

13. The method of claim 9 further including excluding edge pixels as the original pixel.

14. The method of claim 9 further including excluding image regions comprising black or white image regions.

15. In a xerographic system, an assembly for processing scanned data representative of a document image to detect distinct halftone regions of the image as contone, low frequency halftone or high frequency halftone comprising:
 a processor for segmenting the image into selected regions of pixels, computing halftone noise energy values for the selected regions by combining a squared difference of pixel values for all image blocks in the region, and classifying the regions as contone, low frequency halftone or high frequency halftone based upon a comparison of the computed energy values against a preselected standard.

16. The assembly of claim 15 wherein the processor excludes edge pixels, black portions or white portions from the selected blocks used for the computing of the halftone noise energy values.

* * * * *